Nov. 25, 1958  N. CORDIS  2,861,675
CONTINUOUS WEB-TYPE POULTRY FEEDER
Filed Feb. 9, 1954  4 Sheets-Sheet 1
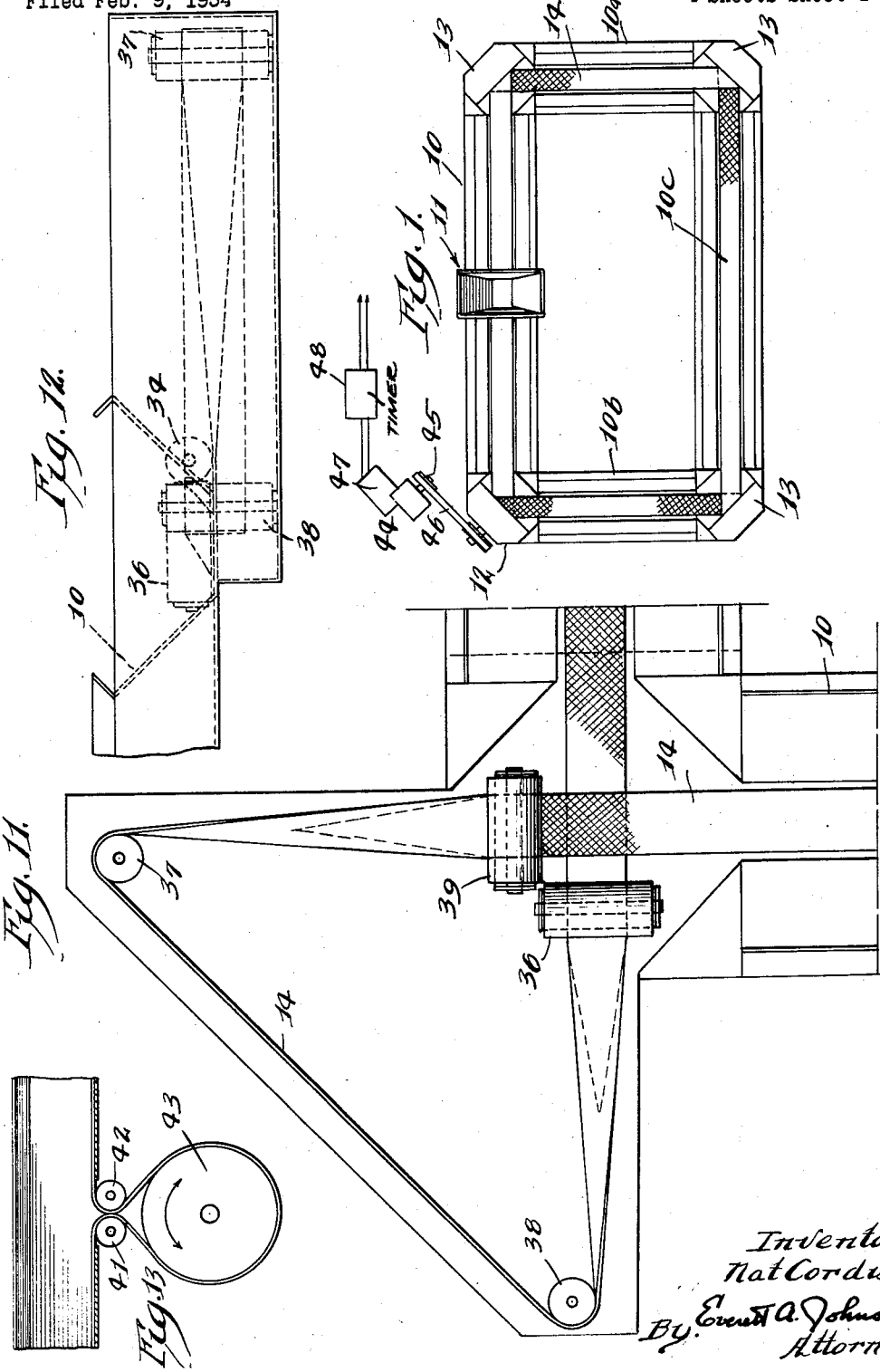
Inventor.
Nat Cordis.
By Everett A. Johnson
Attorney.

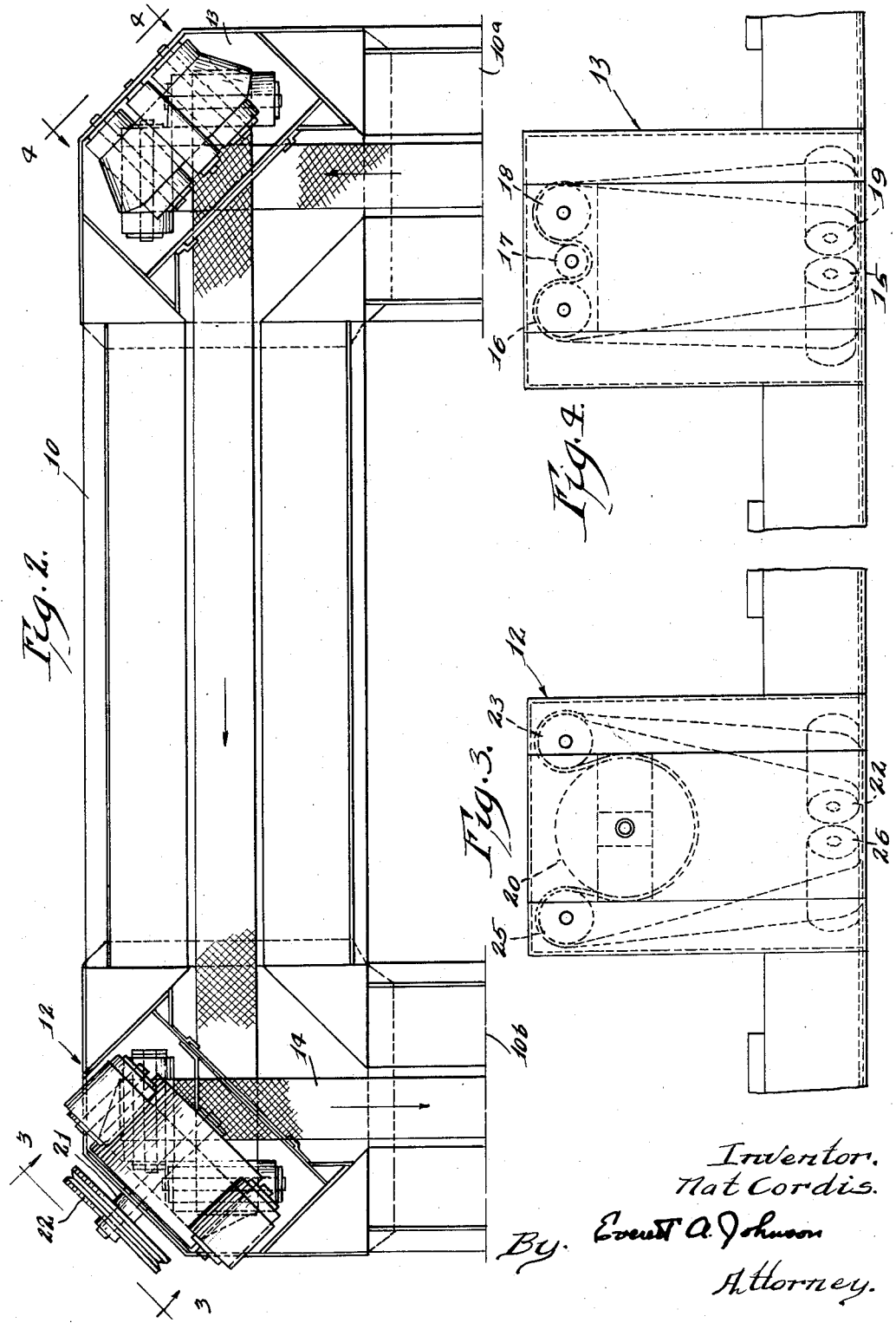

Nov. 25, 1958   N. CORDIS   2,861,675
CONTINUOUS WEB-TYPE POULTRY FEEDER
Filed Feb. 9, 1954   4 Sheets-Sheet 3
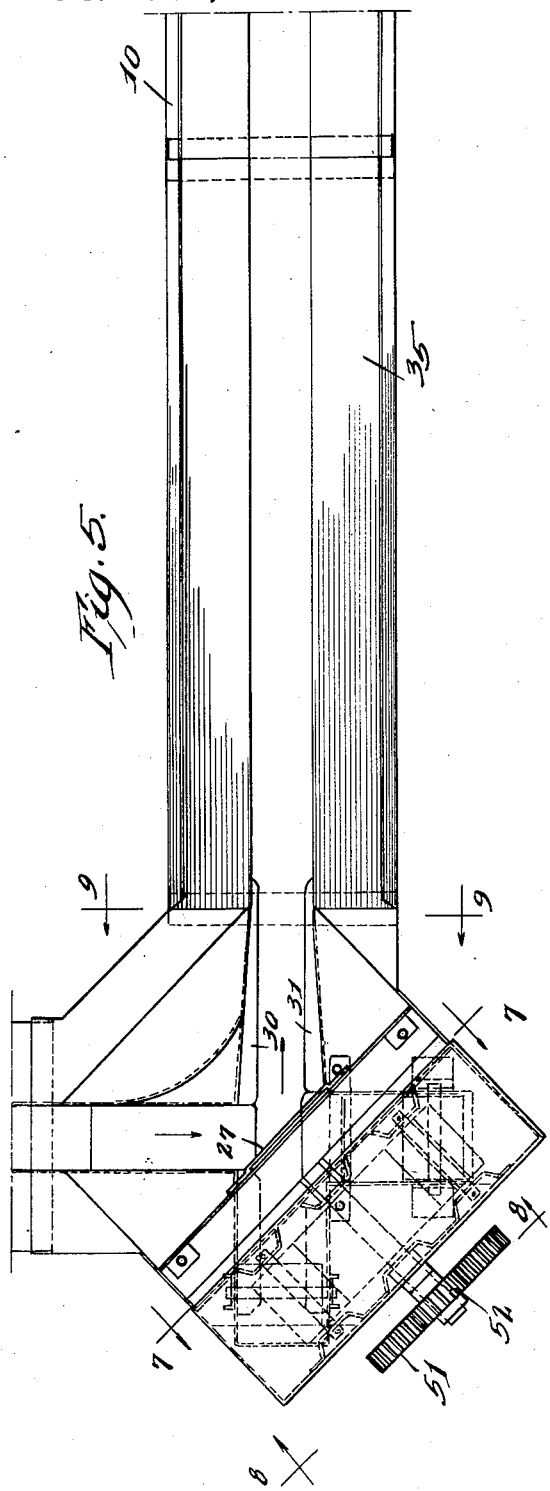
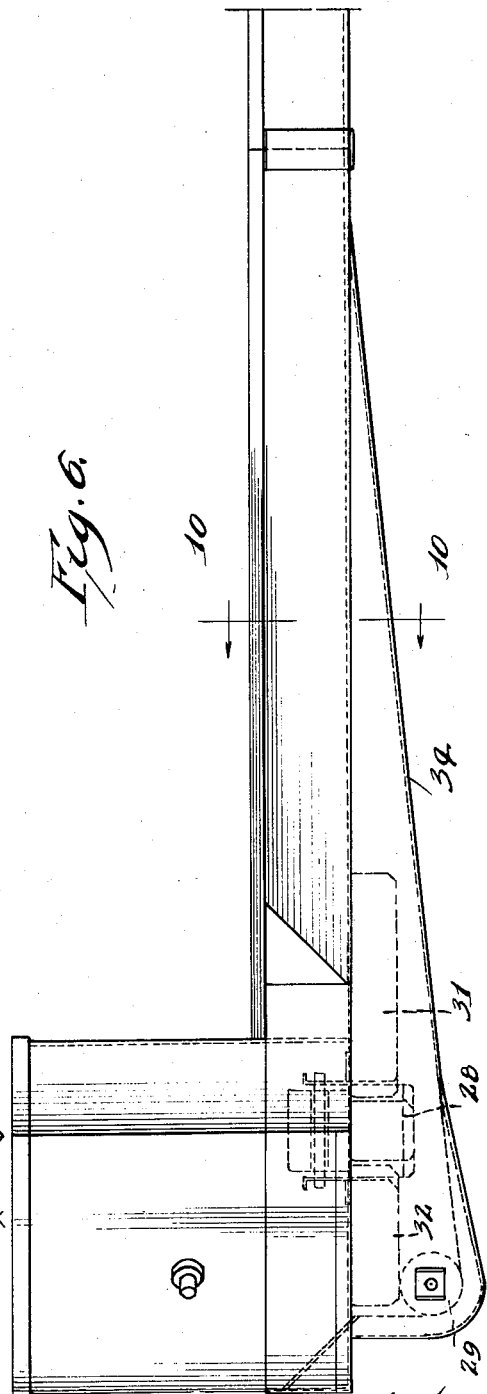
Inventor:
Nat Cordis
By Everett Q. Johnson
Attorney

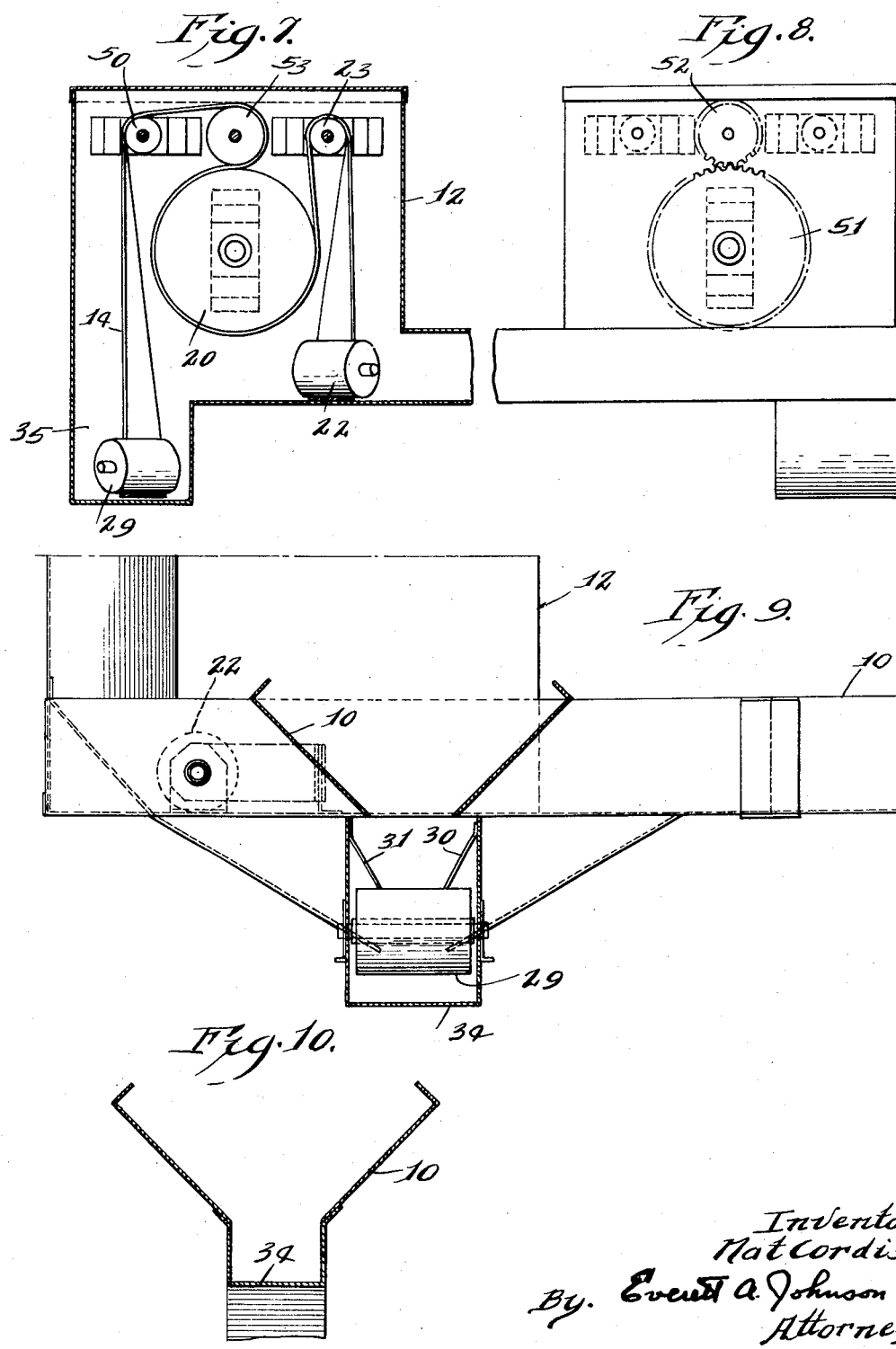

United States Patent Office 2,861,675
Patented Nov. 25, 1958

2,861,675

CONTINUOUS WEB-TYPE POULTRY FEEDER

Nat Cordis, Silver Lake, Wis.

Application February 9, 1954, Serial No. 409,177

6 Claims. (Cl. 198—181)

This invention relates to conveyors for flowable solid materials and, more particularly, to a feeding device for distributing pulverant materials along an open-topped trough accessible to stock including poultry. More specifically, the invention is an improvement in a method and means for automatically distributing feed in a closed circuit trough-type poultry feeder.

The problem of controlled feeding of live stock, such as poultry, on a large scale heretofore has necessarily involved much manual attention. Accordingly, a primary object of this invention is to provide a feeder of large capacity in which the supply can be maintained with a minimum of attention by an operator. Another object is to provide a method and automatic means for uniformly distributing such supply of fresh feed within a continuous or closed circuit flock feeder. An additional object is to provide an automatic and controllable feeder which is silent in operation yet rugged and inexpensive in construction. A further object is to provide an apparatus which maintains a continuously renewed supply of feed in a continuous trough and minimizes the possibility of accumulating stale feed along the path of the conveyor. It is also an object of this invention to provide a conveyor mechanism which is quiet running, which requires a minimum of attention for maintenance of its mechanical components, and which does not tend to disturb the feeding poultry. Likewise, it is a further object to provide a system which can handle various types of feed and without tending to grind the feed within the trough.

A further important object is to provide an apparatus which is readily expandable for various sizes of flocks of poultry but which is also efficient for use in connection with relatively small flocks. These and other objects of my invention will become apparent to those skilled in the art as the description thereof proceeds.

Briefly, this invention provides an improved poultry or stock feeder of the type wherein a feed conduit comprising an open-topped horizontal trough is arranged in communication with a supply hopper and wherein an endless flexible distributing means comprising a feed-impervious woven web or tape is moved longitudinally of the trough within a closed circuit. More particularly, according to this invention, the feed is distributed within the trough means by a continuous or endless flexible distributing web which moves longitudinally along the bottom of the open-topped trough. The word "flights," as used herein, has reference to the straight lengths of trough and to the lengths of the distributing tape or web means which runs within the same portion of the trough means. At intersecting flights, corners are provided for directing the flights of webbing at about 90° angles. The feed supply hopper may be placed at any convenient point, but ordinarily will be just beyond a corner so as to minimize any tendency of feed to accumulate within the corner. In traversing the corner, flights of webbing are superposed whereby the feed being distributed is caused to discharge upon the webbing emerging from the corner, such emerging tape being substantially free of feed.

At the corners for the tape it is desired to change the direction of travel of the endless flexible distributing means in the presence of a minimum of feed. I have, therefore, devised a system for removing feed from the entering flight of webbing and transferring it to the emerging flight at each corner. It is also desired to drive the endless distributing means in a closed circuit and I have devised a positive drive means which is incorporated with one of the corners. The drive is of rugged construction, but has a minimum of moving parts. Further, the drive and idler corners are of interchangeable design and construction permitting the inversion of either to the other by relatively simple substitution of elements.

Details of my invention will be described by reference to particular embodiments thereof illustrated in the drawings wherein:

Figure 1 is a schematic plan view showing the general arrangement of a closed circuit feeder embodying the principles of my invention;

Figure 2 is a plan view showing details of an idler corner and a drive corner;

Figure 3 is a view taken along the line 3—3 in Figure 2 of a drive corner;

Figure 4 is a view taken along the line 4—4 in Figure 2;

Figure 5 is a top view of a preferred drive corner;

Figure 6 is an elevation of the drive corner illustrated in Figure 5;

Figure 7 is a section taken along the line 7—7 in Figure 5;

Figure 8 is an elevation of the drive corner of Figure 5 viewed along the line 8—8;

Figure 9 is a view taken along the line 9—9 in Figure 5;

Figure 10 is a section taken along the line 10—10 in Figure 6;

Figure 11 shows an alternative corner structure wherein the reversing rollers are in a substantially horizontal unit;

Figure 12 is a section taken along the line 12—12 in Figure 11; and

Figure 13 illustrates another embodiment of a drive means which may be placed along the trough.

Referring to Figure 1, a stock feeder is shown having an open-topped trough 10, a feed supply hopper 11, a drive corner 12, three idler corners 13, 13a and 13b, and an endless flexible distributing means 14 disposed within the trough 10 and running on the bottom thereof.

A preferred form of endless flexible distributor means 14 is a woven fabric webbing or tape which is imperious to feed and which has a ribbed undersurface which will sweep the bottom of the trough clean. Alternatively, the lower surface, i. e., the side of web 14 which travels in contact with the bottom of the trough 10, may be provided with V-shaped ribs or plows made of woven cord or rubber. Such ribs are arranged with the apex of the plow pointing in the direction of the travel of the web and serve to continuously urge the feed from under the webbing toward the edges thereof thereby causing the feed below the tape to be disposed on the tape.

Stretch-resistant webbing made of cotton duck, rayon cord, nylon, and a mixture of natural and synthetic fibers may be used. Likewise, the webbing may be provided with strands of wire which does not stretch appreciably. However, a take-up can be provided by making one or more of the rollers in the corners adjustable with respect to another roller therein. Likewise, a telescoped portion of two trough sections may be adjustably linked to change the length of the web path in traveling through the trough circuit.

Referring to Figures 2, 3 and 4, the idler corner 13 is spaced from the drive corner 12 by a flight of trough 10. Merging with the corner 13 is an additional flight of trough 10a and additional idler corners 13a and 13b together with a flight of trough 10c complete the circuit as illustrated in Figure 1.

The tape or webbing 14 travels along the bottom of the trough 10a and passes below the web guide roller 15, passes upwardly over the top guide roller 16, below the intermediate roller 17, over the second top guide roller 18 and over the second bottom web guide 19 with the result that the tape passing within trough 10 has made a 90° turn.

The webbing 14 is caused to travel in the circuit illustrated by Figure 1 by means of a drive roller 20 which is driven through shaft 21 and pulley 21a. As described with respect to the construction of the idler corner 13, the webbing 14 passes below a first idler roller means 22, turns upwardly about first top guide roller 23, then below the drive roller 20 over the second top guide roller 25 and under bottom web guide roller 26 into flight 10b of trough 10. Figures 3 and 4 illustrate the path of the webbing 14 in passing through the idler corner 13 and the drive corner 12.

In the embodiment of Figures 2, 3 and 4, the various flights of trough 10 are all in the same plane and the webbing 14 in passing through the corner, whether it be an idler or drive corner, are superposed and feed carried by the entering flight of webbing is skimmed therefrom and deposited upon the emerging flight of webbing.

The modification of the drive corner illustrated in Figures 5, 6, 9 and 10 can also be applied to the idler corners. In this modification, the corners are modified by placing the second bottom web guide roller means below the level of the bottom of the flight of trough in which the emerging webbing is caused to travel. By this means, the feed carried by the entering flight of webbing has all of its feed removed by the top scraper 27 and bottom web scraper 28 before it enters the corner assembly. The emerging flight of webbing 14 passes below the second bottom web guide roller 29 and travels below the point of feed transfer from the entering webbing. A plurality of baffles 30, 31, 32 and 33 may be provided for guiding any accumulation of transported feed onto the lower flight of webbing 14. The bottom of the trough which carries the emerging flight of webbing (note Figures 6, 7, 9 and 10) is gradually sloped upwardly to the level of the main portion of the succeeding flight of trough.

The pattern of Figures 5 and 6 is repeated at each corner so that the already loaded webbing is drawn along the trough flight into the corner; the feed is removed, as by scraping, from the entering webbing; and the feed discharges onto the lower emerging flight of webbing which is traveling along the sloped bottom 34 of the channel 35 which joins with the level flights of troughs.

A typical operation of this system involves the discharge of feed from the hopper 10 onto a flight of tape traveling counterclockwise in Figure 1 to the drive corner 12 and then in series through the idler corners 13, 13a and 13b and along intermediate trough flights 10a, 10b, 10c and 10. Preferably, the webbing emerges from a point in the respective corner which is substantially below the level of the main feeding trough circuit. This is illustrated in Figures 5, 6 and 7 as described above.

Another form of corner construction is illustrated in Figures 11 and 12. In this embodiment, the tape travels below roller 36, about vertically journaled roller 37, and the tape standing on edge travels about guide roller 38 and ultimately below roller 39 which causes the tape to twist in its original flat position. The passage of one portion of the web 14 over the other results in the transfer of feed from the lower flights onto the upper flights.

Another form of drive means for the continuous webbing 14 is illustrated in Figure 13 wherein a pair of opposed rollers 41 and 42 guide the webbing 14 about the drive drum 43. The drive drum 43 can be turned in either direction by a suitable pulley, motor and transmission (not shown). For simplicity, I have not described in any detail the drive mechanism for use on the drive corner 12. However, a suitable arrangement is to provide a motor and transmission 44 having an output pulley 45 over which a belt 46 travels and engages the pulley 22 of the drive corner 12. The transmission 44 is in turn driven by an electrical motor 47, the current to which is controlled by a timer 48.

To improve the belt driving characteristics of the drive corner 12, I may positively drive the top guide roller 53 (Figure 7) by a gear system including a drive gear 51 on the pulley shaft (Figure 8) which merges with a driven gear 52 mounted on the shaft which supports the top guide roller 53. A similar positive gear driving assembly may be applied to the drive corner illustrated in Figures 2 and 3.

If desired, a litter-removing means may be provided including a vibrated shaker disposed within the path of the webbing. For example, the litter-removing means may include roller means to provide a step in the travel of the webbing with the vibrated shaker disposed adjacent the step to deflect litter from the trough.

A feature of my improvement is the design of idler and drive corners which are identical in their essential framework design. This permits the interchange of various components between the functionally distinct units and reduces substantially the fabrication costs. Thus, the idler corner corresponding to the drive corner of Figures 7 and 8 threads the webbing about the top three rollers in a manner corresponding to that illustrated in Figure 4.

The foregoing description has been with respect to a closed circuit system wherein three idler corners are associated with a single drive corner. It is contemplated, however, that the principles of design incorporated herein may be utilized in a closed trough circuit which includes only a drive end and a turnaround end with flights of trough running in parallel therebetween. This general type of feeder is described and claimed in my co-pending application Serial No. 396,699, filed December 7, 1953, and entitled "Straight-Line Tape-Type Feeder."

Although my apparatus has been described in terms of particular embodiments thereof which have been set forth in considerable detail, it should be understood that this is by way of illustration only and that my invention is not limited thereto. Alternative constructions and operating techniques will become apparent to those skilled in the art in view of my disclosure and, accordingly, it is contemplated that modifications can be made without departing from the spirit of the described invention.

What I claim is:

1. A stock feeder comprising an open-topped trough means into which a feed supply is discharged, an endless continuous webbing drawn through said trough means adjacent the bottom thereof, a plurality of idler corners, a drive corner, each of said corners including a housing arranged in alignment with two adjacent flights of trough, a first web guide means in said corner in alignment with a first flight of said trough, a second web guide means in alignment with a second flight of said trough, said first and second web guide means having axes intersecting at about 90°, and an upper roller means having its axis of rotation in a vertical plane at about 45° to the longitudinal axis of the said flights of said trough means.

2. The apparatus of claim 1 wherein the said upper roller means comprises a roller of substantially greater diameter than said first and second web guides.

3. The apparatus of claim 1 wherein the said upper roller means comprises a system of at least three rollers all having their axes parallel to each other and transverse to the direction of travel of the webbing over said first and second web guide means.

4. In a poultry feeding apparatus the combination of a feeding trough means comprising an endless circuit in a substantially horizontal plane, flexible endless webbing movable within said trough means longitudinally therethrough, said webbing being substantially imperforate and capable of supporting poultry feed on the upper surface thereof, means for supplying power to the webbing to drive it through said trough means, said drive means including a first webbing guide means in alignment with a first flight of said trough, a second webbing guide means in alignment with a second flight of said trough, and upper roller means having its axis of rotation in a vertical plane bisecting the angle between said first and second flights of trough, and hopper means for supplying feed to be moved by the webbing along the said trough means.

5. A stock feeder comprising an open-topped trough means into which a feed supply is discharged, an endless continuous webbing drawn through said trough means adjacent the bottom thereof, a plurality of corners, each of said corners including a housing arranged in alignment with two adjacent flights of trough, a first web guide means in said corner in alignment with a first flight of said trough, a second web guide means in alignment with a second flight of said trough, said first and second web guide means being rotatable about axes intersecting at about 90°, the said second web guide means being disposed at a level below the level of said second flight of trough, and an upper roller means having its axis of rotation in a vertical plane at about 45° to the longitudinal axis of the said flights of said trough means.

6. In a poultry feeding apparatus the combination of a feeding trough means comprising an endless trough circuit in a substantially horizontal plane, flexible endless webbing movable within said trough means longitudinally therethrough, said webbing being substantially imperforate and capable of supporting poultry feed on the upper surface thereof, means for supplying power to the webbing to drive it through said trough means, a plurality of corners, each of said corners including a first web guide arranged transverse to the axis of a first flight of trough means, a second web guide means arranged transverse to a second flight of trough means, and upper roller means having its axis of rotation in a vertical plane substantially bisecting the angle of intersecting vertical planes passing through the longitudinal axis of the said first and second flights, and hopper means for supplying feed to be moved by the webbing along the said trough means.

References Cited in the file of this patent

UNITED STATES PATENTS

| | | |
|---|---|---|
| 2,222,019 | Buchanan | Nov. 19, 1940 |
| 2,589,706 | Kitson et al. | Mar. 18, 1952 |
| 2,591,609 | Roberts et al. | Apr. 1, 1952 |

FOREIGN PATENTS

| | | |
|---|---|---|
| 641,399 | France | Apr. 16, 1928 |